(No Model.) 4 Sheets—Sheet 1.

J. F. PACKER.
CULTIVATOR.

No. 529,135. Patented Nov. 13, 1894.

(No Model.) 4 Sheets—Sheet 3.
J. F. PACKER.
CULTIVATOR.

No. 529,135. Patented Nov. 13, 1894.

Witnesses:
Wm. F. Hanning
Wm. N. Rheem

Inventor:
John F. Packer,
by Bond, Adams & Pickard,
his Attys.

(No Model.) 4 Sheets—Sheet 4.
J. F. PACKER.
CULTIVATOR.
No. 529,135. Patented Nov. 13, 1894.
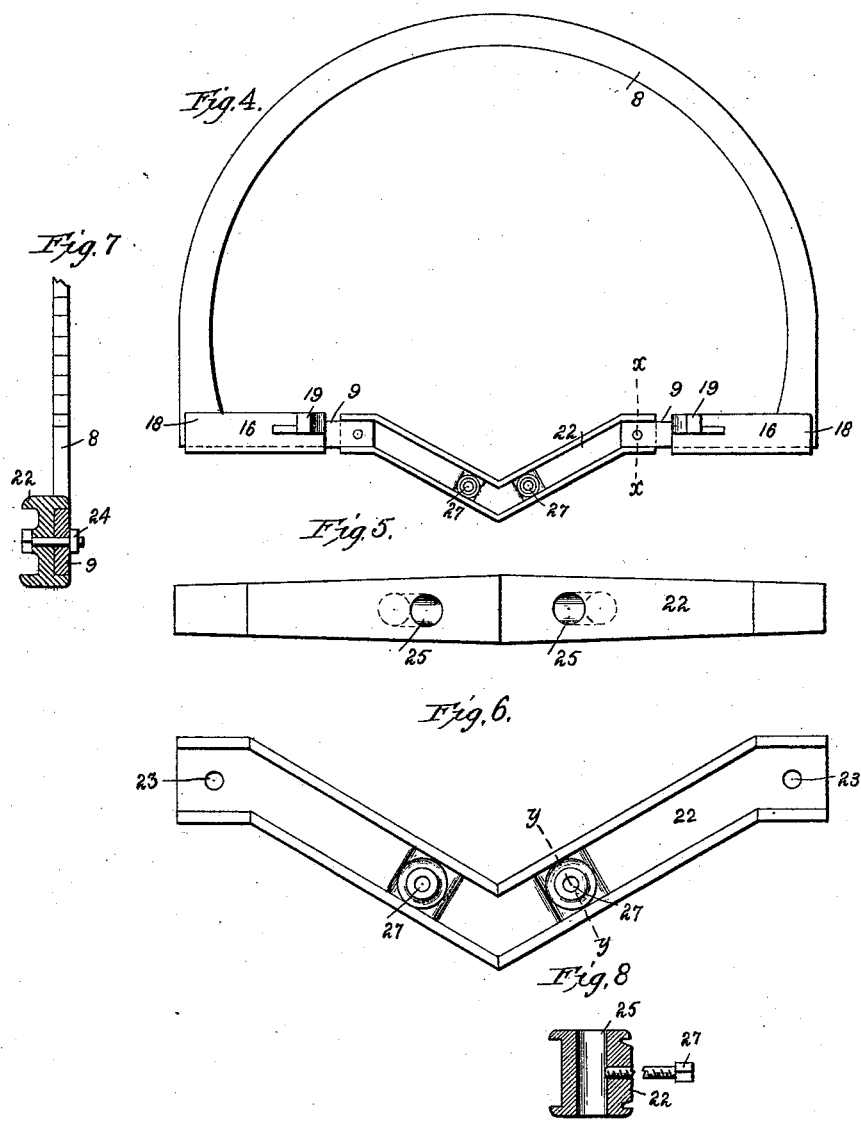

UNITED STATES PATENT OFFICE.

JOHN F. PACKER, OF LA GRANGE, ILLINOIS.

CULTIVATOR.

SPECIFICATION forming part of Letters Patent No. 529,135, dated November 13, 1894.

Application filed January 18, 1892. Serial No. 418,528. (No model.)

*To all whom it may concern:*

Be it known that I, JOHN F. PACKER, a citizen of the United States, residing at La Grange, in the county of Cook and State of Illinois, have invented certain new and useful Improvements in Cultivators, of which the following is a specification, reference being had to the accompanying drawings, in which—

Figure 1:
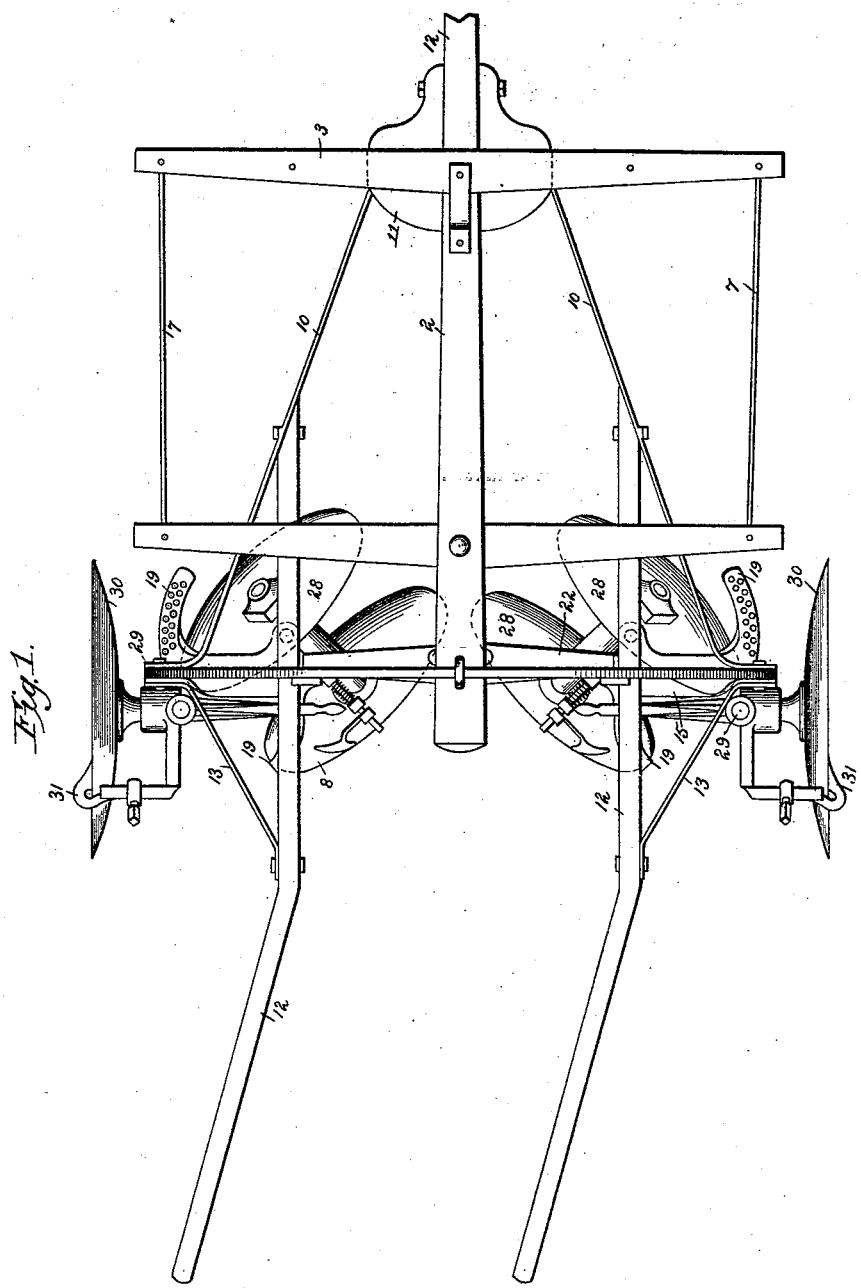
Figure 2:
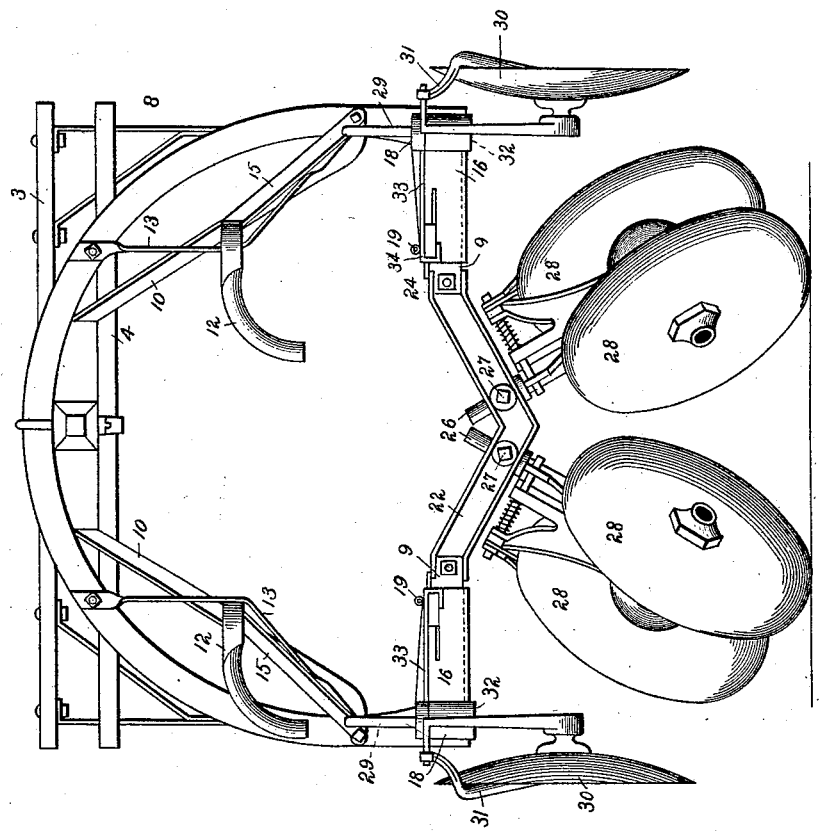
Figure 3:
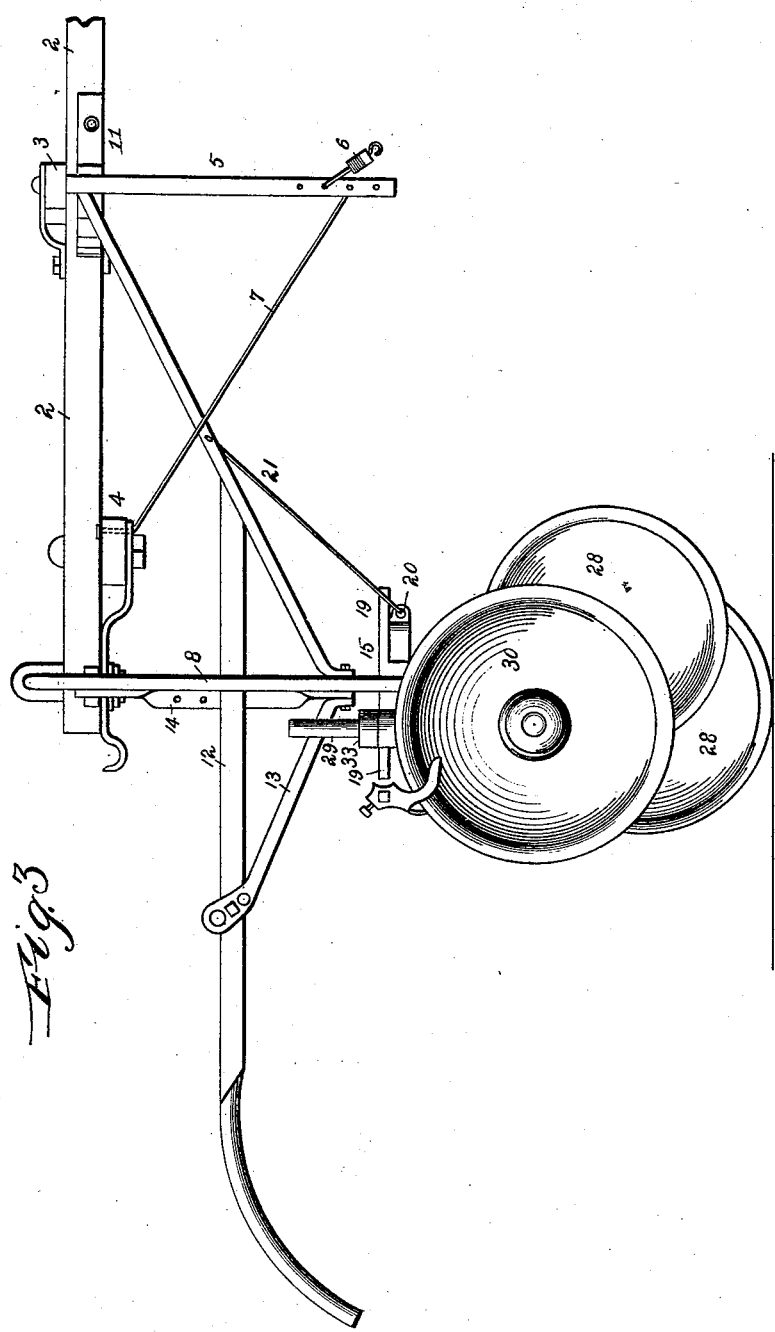

Figure 1 is a top or plan view. Fig. 2 is a rear elevation. Fig. 3 is a side elevation. Fig. 4 is a detail, being a side elevation of the cultivator arch and disk-supporting bar. Fig. 5 is a detail, being a top or plan view of the disk-supporting bar. Fig. 6 is a side elevation of the same. Fig. 7 is a vertical cross section on line $x-x$ of Fig. 4; and Fig. 8 is a cross section on line $y-y$ of Fig. 6.

My invention relates to cultivators, and more particularly to disk cultivators.

The object of my invention is to provide a new and improved cultivator which will be particularly adapted for use in cultivating listed corn, when the crop is at an early stage; and to otherwise improve the construction of cultivators of this class. I accomplish this object as hereinafter specified and as illustrated in the drawings.

That which I regard as new will be pointed out in the claims.

In the drawings,—1, indicates the frame of the cultivator, which is composed of a tongue or pole 2, and double trees 3 and 4 mounted thereupon. The double tree 4 is placed a short distance in the rear of the double tree 3, as best shown in Fig. 1, and is preferably on the under side of the pole.

5, indicates straps, one of which depends from each end of the double tree 3, and is adapted to carry a single tree 6, as best shown in Fig. 3.

7, indicates rods, one of which extends from each end of the double tree 4 to the lower end of the strap 5 on the same side of the pole 2, as best shown in Fig. 1. By this construction the draft is equalized.

8, indicates the cultivator arch, which is secured to the pole 2 at its upper end, and extends downward, preferably in the form of a semicircle, as best shown in Fig. 4. The lower ends of the arch 8 are provided with inward projections 9, as best shown in Fig. 4.

10, indicates brace rods, which extend from a block 11, mounted in the front portion of the frame 1, backward and outward to the lower ends of the arch 8, to which they are rigidly connected by rivets or bolts.

12, indicates the handles of the cultivator, which at their forward ends are secured to the braces 10, and at their rear ends are bent outward at an angle, as shown in Fig. 1.

13, 14, indicate braces for securing the handles in position.

15, indicates brackets, one of which is mounted upon each inward projection 9 of the arch 8, as shown in Figs. 1 and 2. Each bracket consists of a sleeve 16, adapted to fit upon the projection 9.

18, indicates a boss projecting from the outer portion of the sleeve 16, at the rear, as best shown in Fig. 2.

19, indicates a segmental section, which projects to the rear from the inner end of the sleeve 16, and is formed in the arc of a circle of which the boss 18 is the center. The segment 19 is provided with a number of holes, as indicated in Fig. 1.

It will be seen from the foregoing description that the bracket 15 is substantially similar to the bracket described in my application for cultivator, of even date, except that it is not provided with two segments 19 and two bosses 18, as shown in such application. By providing the brackets with the two segments and two bosses, however, they may be used interchangeably on either machine, and in the drawings I have shown a double bracket as being used, although only the rear half of the bracket is in use on my present machine.

The brackets 15 are provided on their inner ends with ears 20, to which are connected brace rods 21, as best shown in Fig. 3. The upper ends of the brace rods 21 are secured to the braces 10, and the rods 21 serve to brace the brackets 15 and inward projections 9 against the resistance of the earth, in cultivating, and prevent their being bent out of line.

22, indicates a bar, which is adapted to be interposed between the inner ends of the extensions 9, and to be secured thereto, as best shown in Figs. 2 and 4. The ends of the bar 22 are provided with bolt-holes 23, through which bolts 24 may be passed for securing it in place, as shown in Fig. 7. The bar 22 is bent downward, preferably at an angle, as shown in Figs. 4 and 6; but if desired, it may be curved.

At opposite sides of the center of the bar 22 are placed bearings 25, which are adapted to receive the shanks 26 upon which the disks are mounted, as will be hereinafter described. The bearings 25 extend about at right angles to the portion of the bar 22 in which they are placed, as best shown in Fig. 2, they being so arranged as to cause the shanks 26 to lie at an angle to each other, thereby throwing the disks outward.

27, indicates binding-screws, which pass through the sides of the bar 22 and are adapted to engage the shanks 26 to lock them in place. By this means, any desired vertical adjustment of the shanks 26 may be secured.

28, indicates disks, a pair of which are mounted upon each shank 26, substantially as described in my application of even date. I do not wish to limit myself, however, to disks mounted in any particular manner upon the shanks 26, as any suitable method of mounting the disks may be used.

29, indicates a shank, which is circular in cross section, and carries at its lower end a rotatable disk 30, as best shown in Fig. 2. A shank 29 carrying a disk 30 is mounted in the bearing in each boss 18, as shown, and is vertically adjustable therein. The disks 30 are so mounted upon the shanks 29 as to have their convex surfaces on the inside, as shown in Fig. 2. Suitable scrapers 31 are provided for scraping the concave surfaces of the disks.

32, indicates collars, one of which is mounted upon each shank 29, below the boss 18 in which it is mounted, and is adapted to be secured at any desired point upon said shank to prevent the weight of the arch and brackets from causing the brackets 15 to slide down to the lower end of the shank.

33, indicates levers, which fit upon the shanks 29 and are adapted to be secured thereto. The outer ends of the levers 33 are adapted to move over the segments 19, and pins 34 are provided, which pass through the handle and the holes in the segments, to secure the levers at any desired point.

Before cultivation, listed corn plants lie in the bottom of a trench formed by the planter, the dirt lying in ridges on each side of the corn rows. In cultivating such corn, especially for the first time, it is desirable that the earth on each side of the rows should be scraped away so as to thoroughly pulverize the dirt around the plants, and also to widen the furrow in which the corn is planted, so as to allow more sunshine to reach the plants. In cultivators adapted for use in this kind of cultivation, it has heretofore been found very difficult to direct the motion of the cultivator so that it would maintain its proper position with regard to the row. With the use of my improved cultivator, however, the disks 30 at each side of the cultivator arch travel on the ridges at each side of the corn row, and generally on the side of the ridges away from the row of plants being cultivated. As their convex side is on the inside, that is, is next to the side of the ridge, they form a resistance against the sides of the ridges which cannot be overcome by the action of the two double disks working in the trench between, and therefore serve to hold the cultivator steady. The work of guiding by the operator is thereby practically done away with.

The shanks 26 are set at such an angle that as the cultivator is drawn forward the disks 28 will cut away the earth from the sides of the ridges, and will carry it away from the row of plants.

When desired, the bar 22 may be removed, and by using brackets having two segments 19 and two bosses 18, the cultivator may be readily arranged for general use.

While the outer reversed concavo-convex disks are the best, I do not limit myself to the use of such disks for this purpose, as plain or flat disks may be used.

For cultivating listed corn the cultivator disks are arranged in an inclined position, as illustrated; but for other classes of work, such for instance as surface cultivation, the disks will not be inclined, but will be arranged in a vertical position, or substantially so.

That which I claim as new, and desire to secure by Letters Patent, is—

1. In a listed corn cultivator, the combination with an arch and inclined disks, of lateral disk guides connected with the arch and adapted to run in the ridges at each side of the plant-containing trench, to guide the cultivator, substantially as described.

2. In a disk cultivator, the combination with a supporting frame, of inclined disks carried by said frame, and outer lateral disk guides, substantially as described.

3. In a disk cultivator, the combination with a supporting frame, and oppositely inclined cultivating disks, of convex disks mounted at the outer sides of said cultivating disks, to serve as guides, the convex surface of the disks being next to said cultivating disks, substantially as described.

4. The combination with a cultivator arch, of oppositely inclined cultivating disks carried thereunder, and disks mounted at the ends of said arch, said disks having convex inner surfaces, substantially as described.

5. The combination with a cultivator arch, of an intermediate bar connected with the arch, bearings in said bar, shanks adapted to fit in said bearings, and disks carried by said shanks, substantially as described.

6. The combination with a cultivator arch, and inward projections on the ends thereof, of an intermediate bar connecting said projections, bearings in said bar, shanks adapted to fit in said bearings, and disks carried by said shanks, substantially as described.

7. The combination with an arch 8, projections 9 on the ends thereof, and brackets 15 mounted upon said projections, said brackets having bosses 18, of disks 30, shanks 29, and inclined cultivating disks 28, substantially as specified.

JOHN F. PACKER.

Witnesses:
JOHN L. JACKSON,
CHARLES E. PICKARD.